United States Patent
Harrison

(10) Patent No.: US 9,536,158 B2
(45) Date of Patent: Jan. 3, 2017

(54) BIOMETRIC BASED DEMOGRAPHY TOOL

(71) Applicant: ARBOC, LLC, Bethesda, MD (US)

(72) Inventor: Howard Jason Harrison, Bethesda, MD (US)

(73) Assignee: ARBOC, LLC, Bethesda, MD (US)

( * ) Notice: Subject to any disclaimer, the term of this patent is extended or adjusted under 35 U.S.C. 154(b) by 142 days.

(21) Appl. No.: 13/905,886

(22) Filed: May 30, 2013

(65) Prior Publication Data

US 2013/0322704 A1 Dec. 5, 2013

Related U.S. Application Data

(60) Provisional application No. 61/653,335, filed on May 30, 2012.

(51) Int. Cl.
*G06K 9/00* (2006.01)
*G06Q 30/02* (2012.01)

(52) U.S. Cl.
CPC ........... *G06K 9/00885* (2013.01); *G06Q 30/02* (2013.01)

(58) Field of Classification Search
CPC . G06Q 30/02; G06Q 30/0201; G06K 9/00885
See application file for complete search history.

(56) References Cited

U.S. PATENT DOCUMENTS

| | | | |
|---|---|---|---|
| 2003/0233275 A1 | 12/2003 | Melvin | |
| 2007/0080813 A1 | 4/2007 | Melvin | |
| 2008/0249857 A1 | 10/2008 | Angell et al. | |
| 2008/0249867 A1 | 10/2008 | Angell et al. | |
| 2009/0232357 A1 | 9/2009 | Angell et al. | |
| 2010/0179878 A1 | 7/2010 | Dawson et al. | |
| 2011/0016480 A1* | 1/2011 | Opdycke | 725/10 |
| 2011/0228085 A1 | 9/2011 | Hofman | |
| 2012/0030006 A1* | 2/2012 | Yoder et al. | 705/14.41 |
| 2012/0054028 A1 | 3/2012 | Tengler et al. | |
| 2013/0058531 A1 | 3/2013 | Hedley et al. | |

FOREIGN PATENT DOCUMENTS

WO  0161612 A1  8/2001

* cited by examiner

*Primary Examiner* — Edward Park
(74) *Attorney, Agent, or Firm* — Spano Law Group; Joseph S. Spano

(57) ABSTRACT

Systems and methods to determine demographic attributes of pedestrians in a retail environment are presented. In some examples, media content is selected for presentation to one or more pedestrians based on the determined demographic attributes. In a further example, the media content is interactive, and a response is received from the pedestrian indicating recognition of the interactive media content and an identity of the pedestrian. In some examples, the demographic attributes of a group of pedestrians passing a particular location are aggregated to determine a demographic profile of a pedestrian traffic flow. In some other examples, demographic attributes of pedestrians are derived from biometric responses to a media presentation. Based on the location and duration of visual attention to the media presentation, a demographic attribute of the pedestrian is determined.

20 Claims, 12 Drawing Sheets

| | 104 | | | | 148 | | | | | |
|---|---|---|---|---|---|---|---|---|---|---|
| LOCATION CODE | PEDESTRIAN IMAGE | TIME | HAIR COLOR | HAIR LENGTH | SKIN TONE | SKIN PROFILE | HEAD ORIENTATION | FACIAL GEOMETRY | | |
| | | | | | | | | EY | N | ER |
| A | XYZ123.BMP | 09/12/2011, 06:14:26 | BLK | SRT | BRN | WR | (0,0) | 54 | 25 | 18 | —151 |
| A | ABC125.BMP | 09/12/2011, 06:14:29 | BRN | MID | FAIR | SM | (35,0) | 45 | 15 | 11 | —152 |
| A | RUX155.BMP | 09/12/2011, 06:14:35 | BLD | LNG | FAIR | SM | (35,0) | 51 | 20 | 16 | —153 |
| A | RFT597.BMP | 09/12/2011, 06:14:39 | BLK | LNG | BLK | SC | (0,45) | 53 | 22 | 15 | —154 |
| ⋮ | ⋮ | ⋮ | ⋮ | ⋮ | ⋮ | ⋮ | ⋮ | ⋮ | ⋮ | ⋮ |
| A | XYZ123(2).BMP | 09/13/2011, 06:09:48 | BLK | LNG | BRN | AC | (0,0) | 56 | 25 | 17 | —155 |
| A | RFT597(2).BMP | 09/13/2011, 06:24:16 | BLD | MID | FAIR | SM | (0,0) | 47 | 17 | 13 | —156 |
| A | RUX155(2).BMP | 09/13/2011, 06:26:57 | BLD | MID | FAIR | AC | (0,0) | 48 | 19 | 13 | —157 |

MEMORY 150

FIG. 5

BIOMETRIC BASED DEMOGRAPHY TOOL

CROSS REFERENCE TO RELATED APPLICATIONS

The present application for patent claims priority under 35 U.S.C. §119 from U.S. provisional patent application Ser. No. 61/653,335, entitled "Biometric Based Demography Tool," filed May 30, 2012, the entire subject matter of which is incorporated herein by reference.

TECHNICAL FIELD

The described embodiments relate to demography systems and tools.

BACKGROUND INFORMATION

Biometric recognition systems are typically employed to identify movement and visual characteristics of live subjects. Media displays are typically employed to deliver advertising content to viewers in a wide variety of settings. Simple, static media displays (e.g., printed or painted graphics and text) remain widely used. Typically, the content of a particular static media display is fixed for a lengthy period of time (e.g., weeks or months). In addition to static media displays, dynamic media displays have also been adopted. The content of dynamic media displays can be frequently refreshed. Traditionally, this ability has been utilized to display a series of advertisements so that a passerby may see more than one advertisement before the viewing opportunity ends.

Both static and dynamic media displays are typically located in highly visible areas based on the rationale that highly visible displays reach more potential customers. Moreover, specific advertising content is often displayed in a particular location based on a limited understanding of the demographic profile of viewers at that location. However, in many contexts the understanding of the demographic profile of pedestrians in a retail environment at any given time and the evolution of the demographic profile over time remains very limited. As a consequence, the effectiveness of displayed advertising content is limited. The uncertainty surrounding the effectiveness of display sign advertising generates resistance to capital investment to replace existing signs with more costly signs that provide the ability to display digital media. Improvements in the identification of a demographic profile of pedestrians in a retail environment, its evolution over time, and the selection of media content targeted to the identified demographic profile is desired.

SUMMARY

Systems and methods to determine demographic attributes of pedestrians in a retail environment are presented. In some examples, media content is selected for presentation to one or more pedestrians based on the determined demographic attributes. In a further example, the media content is interactive, and a response is received from the pedestrian indicating recognition of the interactive media content and an identity of the pedestrian.

In one aspect, a demographic attribute of a pedestrian is determined based on a match between biometric attributes of a biometric recognition instance associated with the pedestrian and a biometric template.

In another aspect, the demographic attributes of a group of pedestrians passing a particular location may be aggregated to determine a demographic profile of a pedestrian traffic flow. In a further aspect, publically available demographic profile data is accessed that indicates the retail likes and dislikes of people that match this demographic profile. In this manner, advertisements and incentive offers in the retail facility can be adjusted to meet the desires of the identified demographic profile.

In another aspect, demographic attributes of pedestrians may be derived from repeated biometric instances associated with the same pedestrian at the same or different locations. In this manner, demographics can be inferred from repeated visits and movements of a pedestrian through the retail facility. A biometric based demography tool the biographic attributes associated with one biometric recognition instance with another biometric recognition instance to find a match and identify repeated biometric instances of the same pedestrian.

In yet another aspect, demographic attributes of pedestrians may be derived from biometric responses to media content. In this manner, demographics can be inferred from the response of pedestrians to media displayed in a retail facility. A biometric based demography tool determines the location and duration of visual attention of each pedestrian to a media presentation based on changes in biometric attributes associated with a sequence of biometric recognition instances captured during the media presentation. Based on the location and duration of visual attention of the pedestrian, a demographic attribute of the pedestrian is determined.

In yet another aspect, biometric information may be analyzed to determine the number of people in the retail facility at any given time and as a function of time, the rate of ingress and egress of people at a given location (e.g. retail facility entrances) at any given time and as a function of time, the number of repeat visitors present within the retail facility at any given time and as a function of time, etc. In some embodiments, the identity of repeat visitors may be determined from an analysis of biometric information.

The foregoing is a summary and thus contains, by necessity, simplifications, generalizations and omissions of detail. Consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 5 is a diagram illustrative of a plurality of biometric recognition instances 151-157 stored in memory 150.

DETAILED DESCRIPTION

Reference will now be made in detail to background examples and some embodiments of the invention, examples of which are illustrated in the accompanying drawings.

Figure 1:
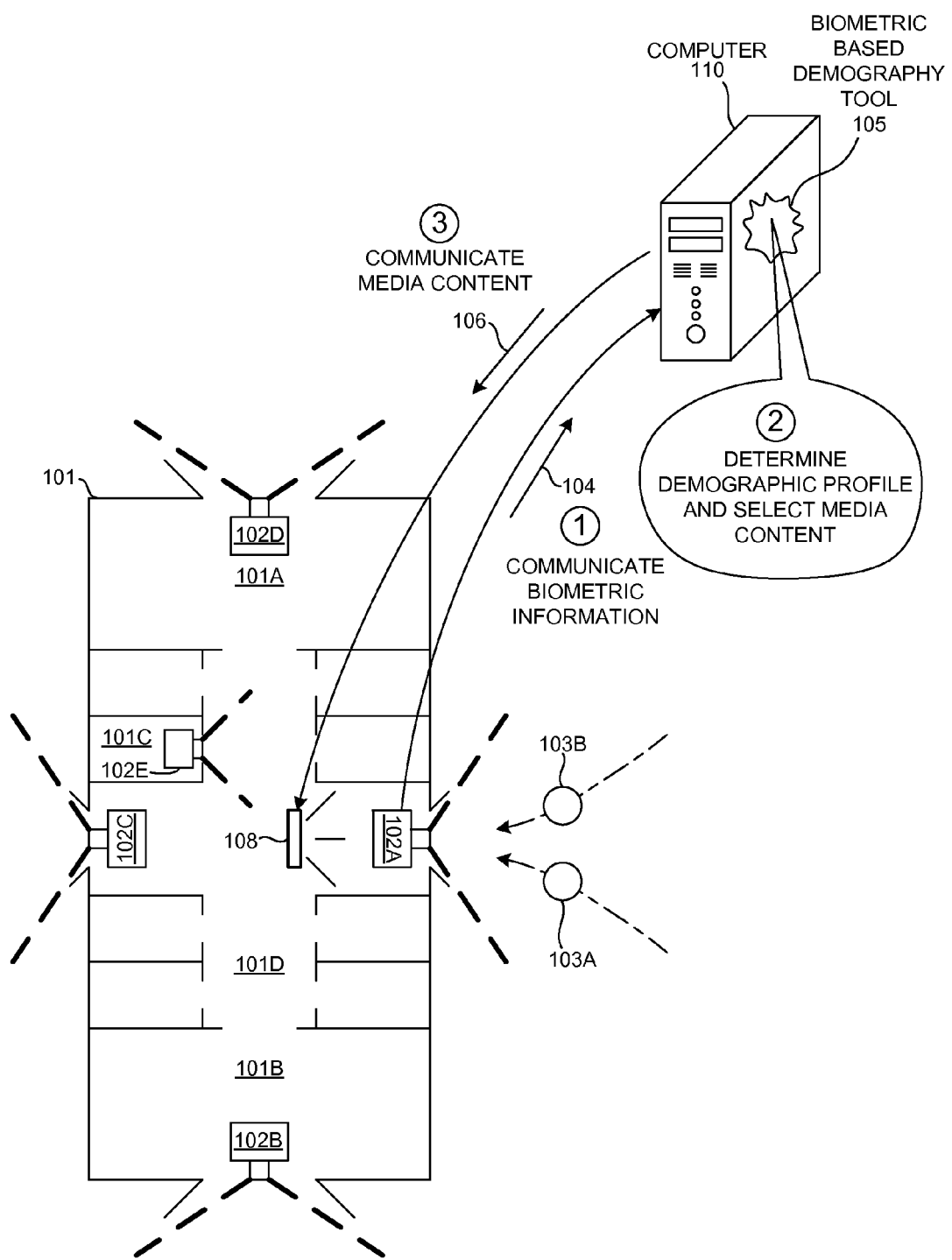
FIG. 1 is a diagram illustrative of an embodiment of a biometric based demography system in one exemplary operational scenario.

FIG. 1 is a diagram illustrative of an embodiment of a biometric based demography system in one exemplary operational scenario. The biometric based demography system includes one or more biometric recognition units (e.g., biometric recognition units 102A, 102B, 102C, and 102D) and general purpose computer 110 operable to implement biometric based demography tool 105. Each biometric recognition unit is communicatively coupled to general purpose computer 110. For example, each biometric recognition unit may be communicatively coupled to computer 110 by a wired or wireless communication link. In some embodiments, computer 110 may be collocated with each biometric recognition unit (e.g., a digital signal processor on board each biometric recognition unit). In some other embodiments, computer 110 may be distally located from each biometric recognition unit. For example, in some embodiments, computer 110 may be a server located at a central facility and computer 110 may be communicatively linked to one or more distally located biometric recognition units.

Figure 4:
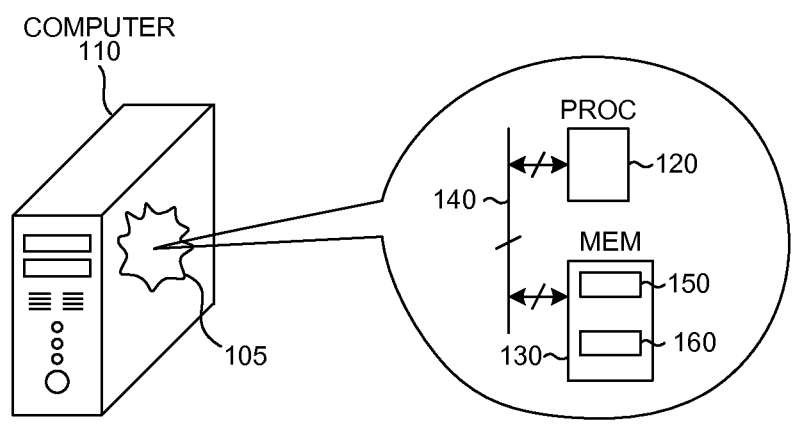
FIG. 4 is a diagram illustrative of a computer 110 configured to implement biometric based demography functionality by operation of biometric based demography tool 105.

As illustrated in FIG. 4, computer 110 includes a processor 120 and a memory 130. Processor 120 and memory 130 may communicate over bus 140. Memory 130 includes an amount of memory 150 that stores a number of images captured by a biometric recognition unit. Memory 130 also includes an amount of memory 160 that stores program code that, when executed by processor 120, causes processor 120 to implement biometric based demography functionality by operation of biometric based demography tool 105.

In the embodiment illustrated in FIG. 1, a number of biometric recognition units 102A-E of a biometric based demography system are placed at various locations of a retail facility 101 (e.g., a mall, shopping center, plaza, etc.). Pedestrians walk through retail facility 101 passing within view of various biometric recognition units 102A-E. Biometric based demography system 100 captures biometric information 104 associated with pedestrians as they pass each biometric recognition unit 102 and determines demographic attributes associated with pedestrians based on the biometric information 104.

In addition, in some embodiments, biometric based demography system 100 selects media content 106 based on the demographic attributes, and presents the selected interactive media content 106 to pedestrians as they pass a display unit 108. For example, based on the demographic profile of pedestrians determined by biometric based demography tool 105, advertisements likely to appeal to the pedestrians are presented on display unit 108 within view of the pedestrians.

In addition, in some other embodiments, the biometric based demography system selects media content 106 that is interactive based on the determined demographic attributes, and presents the selected interactive media content 106 to pedestrians as they pass a display unit 108. Pedestrians respond to the displayed interactive media content by communicating a message to computer 110. The message (e.g., e-mail, text message, text-based web post, etc.) includes the identity of the pedestrian (e.g., e-mail address, phone number, web address, etc.) and an indication that the pedestrian specifically recognized the interactive media content 106.

In the illustrated embodiment, biometric recognition unit 102A and display unit 108 are in different locations. However, in other embodiments, they may be collocated (e.g., packaged as one unit). In other embodiments, biometric information may be captured outside of retail facility 101 (e.g., sidewalks and parking lots surrounding retail facility 101), but the selected media content may be presented within the retail facility 101.

Biometric recognition units are placed in fixed locations in view of passing pedestrians. For example, as illustrated in FIG. 1, retail facility 101 includes a mixture of retail spaces. Retail spaces 101A and 101B are large spaces typically reserved for larger stores (i.e., "anchor" stores). In addition, retail facility 101 includes a number of smaller retail spaces (e.g., retail space 101C) and open spaces (e.g., hallway 101D). As illustrated in FIG. 1, by way of non-limiting example, biometric recognition units 102A-D are located at the entrances and exits of retail facility 101. In addition, biometric recognition unit 105E is located at the entrance of retail space 101C. In some embodiments a number of biometric recognition units may be located at a particular location, each configured to capture images of passing pedestrians from different perspectives. For example, a biometric recognition unit may be positioned to face pedestrians from an elevated perspective, another positioned to face pedestrians from a ground level perspective, and another positioned to face pedestrians at head level.

In one embodiment, each biometric recognition unit captures image data of passing pedestrians, derives biometric attributes associated with individual pedestrians from the image data, and communicates biometric information 104 to computer 110. For example, as illustrated in FIG. 1, biometric recognition unit 102A includes a camera module (not shown) that captures at least one image of passing pedestrians 103A and 103B. In some embodiments, biometric recognition unit 102A includes a timing module that determines the time of image capture and a predetermined code that indicates the location of biometric recognition unit 102A. Each captured image, its time of capture, and location of capture are included in biometric information 104 associated with a distinct biometric recognition instance. In addition, in some embodiments, biometric recognition unit 102A performs image analysis on each captured image to identify biometric attributes associated with pedestrian 103A. In these embodiments, biometric recognition unit 102A includes an indication of the biometric attributes associated with each biometric recognition instance with biometric information 104. Biometric information 104 includes biometric attributes derived from images captured by biometric recognition unit 102A. As depicted in FIG. 1, biometric recognition unit 102A communicates biometric information 104 associated with each biometric recognition instance to computer 110.

In some other embodiments, any of the image analysis functions may be performed by computer 110. In one example, biometric information 104 communicated from biometric recognition unit 102A to computer 110 includes captured image data and the time of capture associated with each biometric recognition instance and additional image processing tasks to determine biometric attributes are performed by computer 110. In this example (illustrated in FIG. 7), a biometric recognition unit 102 is simply an image capture unit and image information 107 without biometric attributes, is communicated to computer 110. In another example, the burden of image analysis is shared between biometric recognition unit 102 and computer 110.

Biometric information 104 received by computer 110 is stored in memory 150. FIG. 5 is illustrative of a plurality of biometric recognition instances 151-157 stored in memory 150. Each biometric recognition instance includes biometric information 104 received from biometric recognition unit 102. In the illustrated example, biometric information 104 includes a location code, image information, the time of image capture, an indication of the hair color, hair length, skin tone, skin profile, head orientation, and facial dimensions of the pedestrian.

In one aspect, a demographic attribute of a pedestrian is determined based on a match between biometric attributes of a biometric recognition instance associated with the pedestrian and a biometric template.

Figure 6:
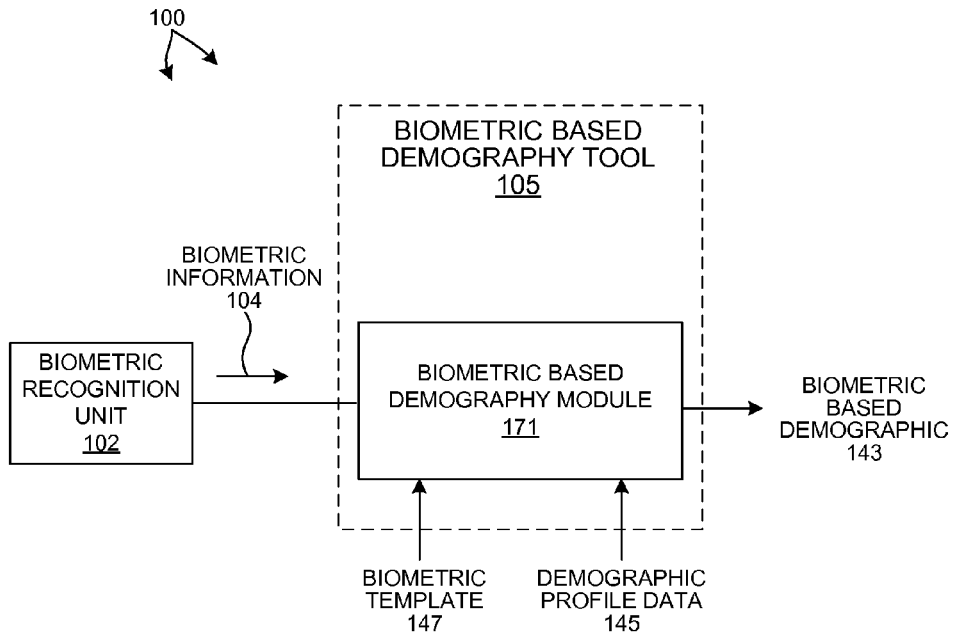
FIG. 6 is a diagram illustrative of a biometric based demography system 100 in one embodiment.

FIG. 6 illustrates biometric based demography system 100 in one embodiment. As illustrated, biometric based demography tool 105 executed, for example, on computer 110 receives biometric information 104 generated by biometric recognition unit 102. Biometric based demography module 171 of biometric based demography tool 105 compares at least one demographic attribute of biometric information 104 with a biometric template 147 to find a match. A demographic attribute of the pedestrian associated with the biometric recognition instance is identified if a match is found. For example, as illustrated in FIG. 5, each biometric recognition instance includes facial geometry dimensions for eye spacing ("EY"), nose width ("N"), and ear spacing ("ER"). In one example, a biometric template 147 associated with a small child may include dimensional ranges of these facial features that are consistent with a small child. An exemplary biometric template associated with a small child may include eye spacing between 41 millimeters and 47 millimeters, a nose width between 13 millimeters and 17 millimeters, and ear spacing between 10 centimeters and 14 centimeters. By comparing biometric information 104 of biometric recognition instance 152 with this biometric template, a match is found because each of these dimensions is within the range specified by biometric template 147. In this manner, the pedestrian associated with biometric recognition instance 152 is identified as a small child.

Similarly, at least one demographic attribute associated with each pedestrian associated with a biometric recognition instance may be identified. Exemplary demographic attributes include age, gender, sex, and race of passing pedestrians.

In another aspect, the demographic attributes of a group of pedestrians passing a particular location may be aggregated to determine a demographic profile of the pedestrian traffic flow. In one embodiment, biometric based demography module may determine the demographic profile at a given location and time of day is 30% of passing pedestrians are children, 20% are mid-aged female, 5% are mid-aged male, and 40% are elderly males and females based on aggregation of demographic attributes. In addition, biometric based demography module 171 may access publically available demographic profile data 145 that indicates the retail likes and dislikes of people that match this demographic profile. In this manner, advertisements and incentive offers in the retail facility can be adjusted to meet the desires of the identified demographic profile.

Figure 9:
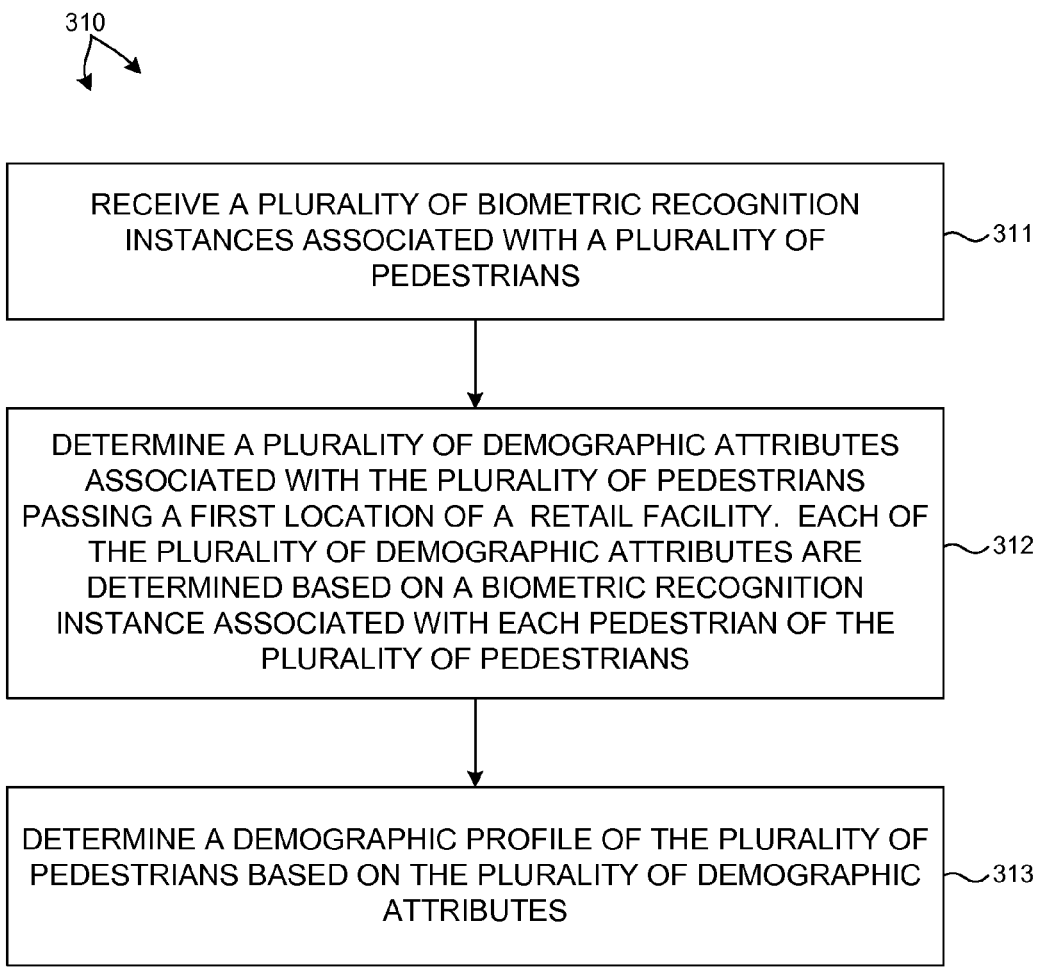
FIG. 9 is a flowchart illustrative of a method of biometric based demographic profiling 310.

FIG. 6 is illustrative of biometric based demography tool 105 operable in accordance with the method of biometric based demographic profiling 310 illustrated in FIG. 9. This illustration and corresponding explanation are provided by way of example as many other embodiments and operational examples may be contemplated. In the depicted embodiment, biometric based demography tool 105 includes biometric based demography module 171. In the depicted embodiment, biometric based demography tool 105 receives biometric information 104 from biometric recognition unit 102. In block 311, of method 310, biometric based demography module 171 receives a plurality of biometric recognition instances associated with a plurality of pedestrians. In one example of block 312, biometric based demography module 171 determines a plurality of demographic attributes associated with a plurality of pedestrians passing a first location of a retail facility. Each of the plurality of demographic attributes is determined based on a biometric recognition instance of each pedestrian. In one example of block 313, biometric based demography module 171 determines a demographic profile of the plurality of pedestrians based on the plurality of demographic attributes. The resulting biometric based demographic 143 is communicated from biometric based demography module 171 for further use by a user of biometric based demography tool 105.

Figure 7:
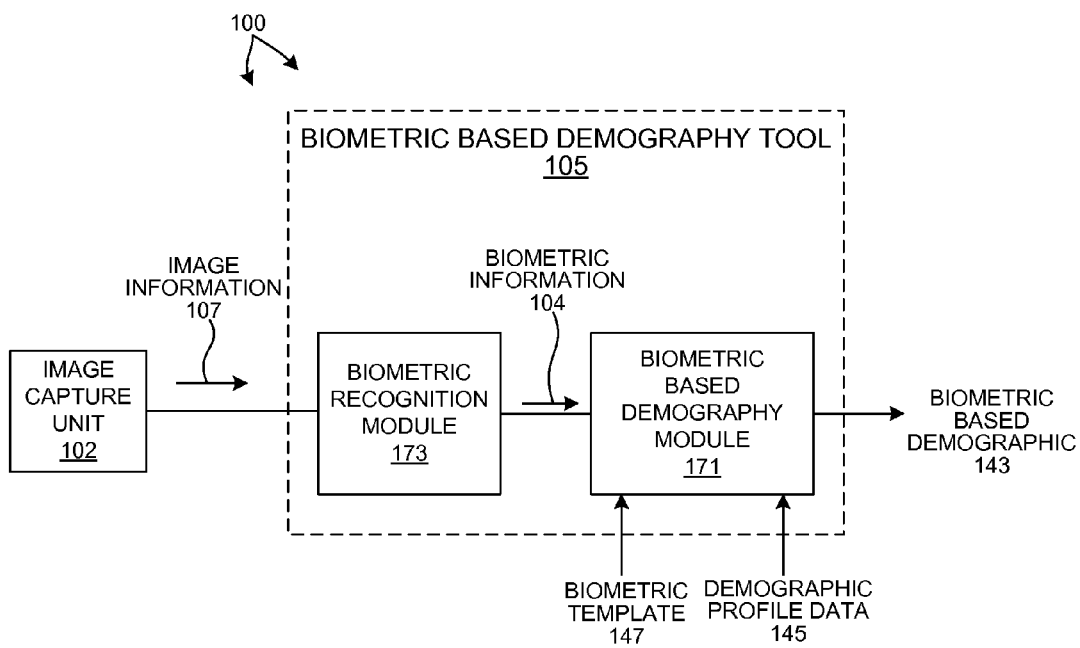
FIG. 7 is a diagram illustrative of biometric based demography system 100 in another embodiment.

FIG. 7 is illustrative of biometric based demography tool 105 operable in a manner analogous to that of FIG. 6. In the embodiment illustrated in FIG. 7, biometric based demography tool 105 includes biometric recognition module 173 operable to receive image information 107 from an image capture unit 102 and determine biometric information 104 from image information 107. Thus, in this embodiment, biometric based demography tool 105 derives the biometric information associated with each biometric recognition instance.

Figure 8:
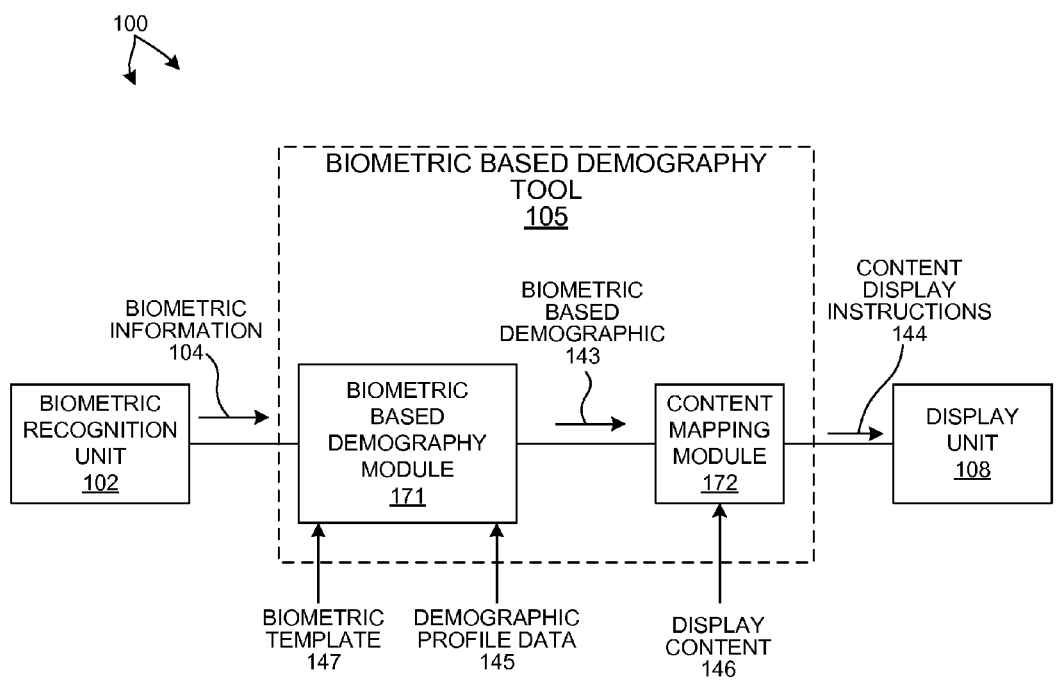
FIG. 8 is a diagram illustrative of yet another embodiment of biometric based demography system 100.

FIG. 8 is illustrative of another embodiment of biometric based demography system 100. In the depicted embodiment, biometric based demography tool 105 includes a biometric based demography module 171 and media content mapping module 172. In the depicted embodiment, biometric based demography tool 105 receives biometric information 104 from biometric recognition unit 102 and determines biometric based demographics 143 as discussed herein. For example, the biometric based demographics 143 indicates a high percentage of pedestrians who are working professionals between ages 35 and 50 years old. Based on the biometric based demographics 143, media content mapping module 172 selects an amount of media content for presentation. Media content mapping module 172 may access display content 146 including a number of different advertisements each targeted differing demographic groups. Media content mapping module 172 maps the biometric based demographics 143 with advertisements that target those demographics. For example, an interactive advertisement for luxury wristwatches is targeted to male and female working professionals between ages 35 and 50 years old. In one example, interactive media content mapping module 172 assigns a high score to the match between the advertisement for luxury wristwatches with the demographics of the passing pedestrians (e.g., 85% match). In contrast, an advertisement for low-priced alcoholic beverages does not target male and female working professionals between ages 35 and 50 years old. As a result, interactive media content mapping module 172 assigns a low score to the match between the advertisement for low-priced alcoholic beverages and the demographics of the passing pedestrians. Based on the assigned scores, content mapping module 172 selects high scoring display content for presentation to the passing pedestrians. Content mapping module 172 generates content display instructions 144 that cause display unit 108 to present the selected interactive media content. For example, content mapping module generates content display instructions 144 that cause display unit 108 to display the two highest ranked advertisements in rank order for five seconds each.

The selected media content may be interactive media content. Interactive media content includes an invitation to respond to the interactive media content electronically. In some embodiments, interactive media content includes a unique identifier that allows a viewer (e.g., pedestrian 103A) to authenticate his or her recognition of the specific interactive media content. For example, an interactive advertisement for a luxury wristwatch may include a promotional code. If the viewer sends an electronic message to computer 110 that includes the code, the viewer receives a discount on a future purchase of the luxury wristwatch.

In one example, a response to the interactive media content is received by computer 110 from pedestrian 103A. The response includes an indication that the pedestrian specifically recognized the interactive media content (e.g., a code embedded in the interactive media content). In addition, the response includes an indication of the identity of the pedestrian (e.g., name, e-mail address, etc.). In this manner, additional interaction between the advertiser and the pedestrian 103A may occur.

Figure 2:
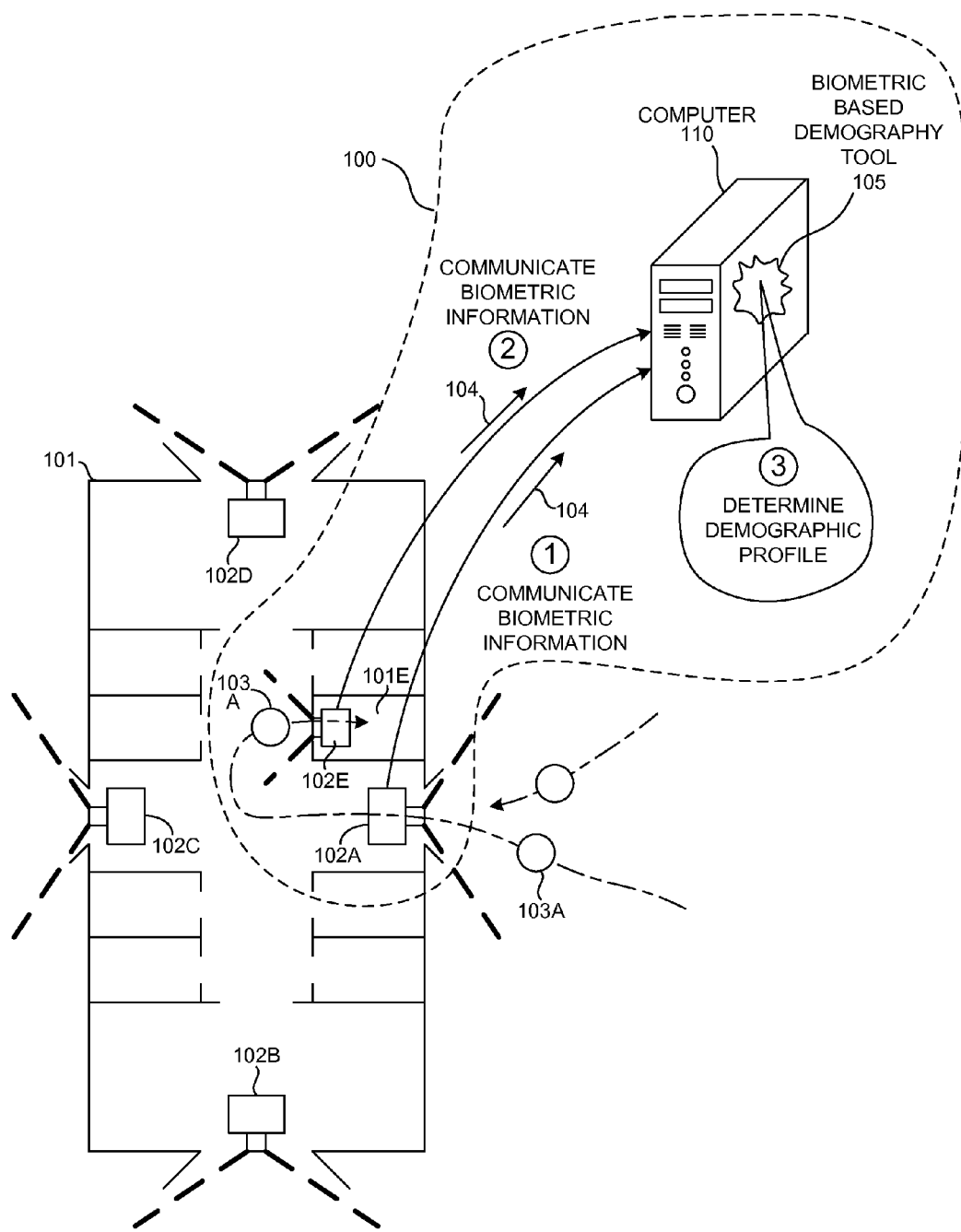
FIG. 2 is a diagram illustrative of an embodiment of a biometric based demography system in another exemplary operational scenario.

In another aspect, demographic attributes of pedestrians may be derived from repeated biometric instances associated with the same pedestrian at the same or different locations. In this manner, demographics can be inferred from repeated visits and movements of a pedestrian through the retail facility. For example, as illustrated in FIGS. 2 and 6, biometric recognition module 102A captures image data of pedestrian 103A entering retail facility 101, generates biometric information 104 including biometric attributes associated with pedestrian 103A and communicates the biometric information 104 to computer 110. Similarly, biometric recognition module 102E captures image data of pedestrian 103A entering retail facility 101E, generates biometric information 104 including biometric attributes associated with pedestrian 103A and communicates the biometric information 104 to computer 110. Biometric based demography module 171 of biometric based demography tool 105 compares the biographic attributes associated with one biometric recognition instance with another biometric recognition instance to find a match. A demographic attribute of the pedestrian associated with the biometric recognition instance is identified if a match is found.

In one example, the same biometric attributes may be repeatedly recognized by a biometric recognition unit 102 each day at a similar time. Based on this pattern of biometric instances, it can be inferred that the pedestrian is a frequent shopper. In another example, the same biometric attributes may be repeatedly recognized at the entrances of the two high end clothiers located in the retail facility. Based on this pattern of biometric recognition instances, it can be inferred that the pedestrian likes expensive goods. In another example, the same biometric attributes may be repeatedly recognized in the hallways of the retail facility, but not in the stores. Based on this pattern of biometric recognition instances, it can be inferred that the pedestrian likes to browse, but is not a frequent buyer.

Figure 10:
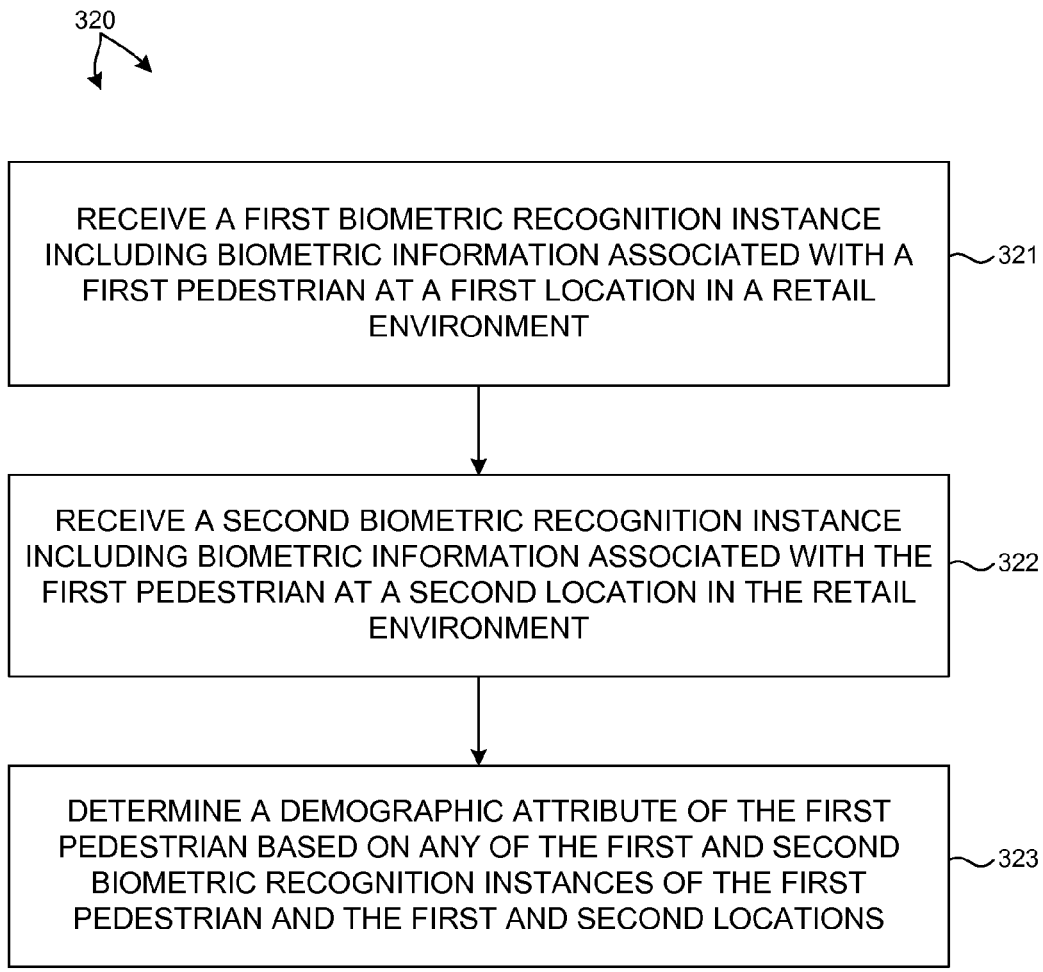
FIG. 10 is a flowchart illustrative of another method of biometric based demographic profiling 320.

FIG. 6 is illustrative of biometric based demography tool 105 operable in accordance with the method of biometric based demographic profiling 320 illustrated in FIG. 10. This illustration and corresponding explanation are provided by way of example as many other embodiments and operational examples may be contemplated. In the depicted embodiment, biometric based demography tool 105 includes biometric based demography module 171. In one example of block 321 of method 320, biometric based demography tool 105 receives a first biometric recognition instance including biometric information associated with a first pedestrian at a first location in a retail environment from a biometric recognition unit 102. In one example of block 322 of method 320, biometric based demography tool 105 receives a second biometric recognition instance including biometric information associated with the first pedestrian at a second location in the retail environment. In one example of block 323 of method 320, biometric based demography module 171 determines a demographic attribute of the first pedestrian based on any of the first and second biometric recognition instances of the first pedestrian and the first and second locations. The resulting biometric based demographic 143 is communicated from biometric based demography module 171 for further use by a user of biometric based demography tool 105.

Figure 3:
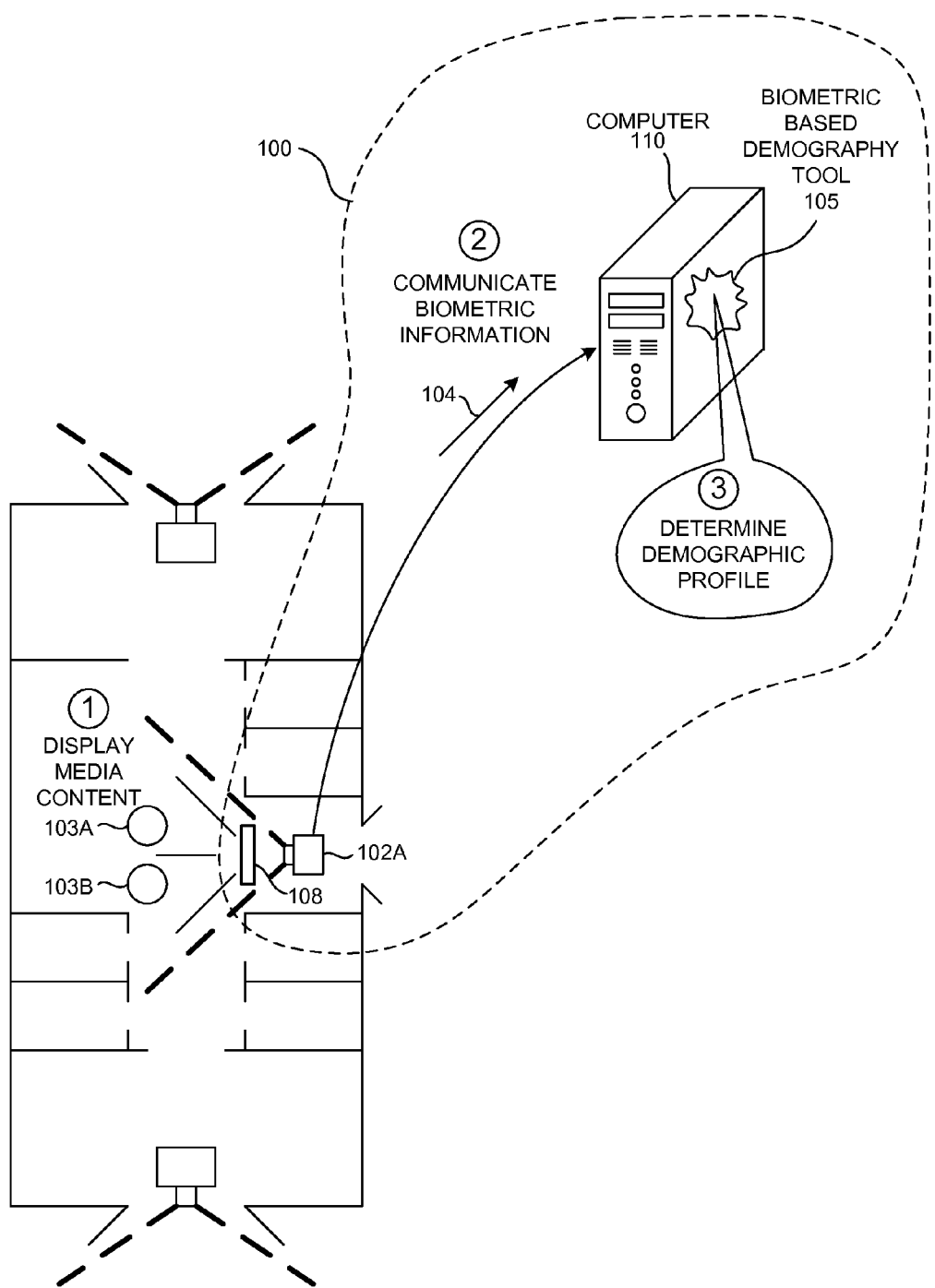
FIG. 3 is a diagram illustrative of an embodiment of a biometric based demography system in yet another exemplary operational scenario.

In yet another aspect, demographic attributes of pedestrians may be derived from biometric responses to media content. In this manner, demographics can be inferred from the response of pedestrians to media displayed in a retail facility. For example, as illustrated in FIGS. 3 and 6, biometric recognition module 102A repeatedly captures time sequenced image data of pedestrians 103A and 103B while they are within view of media content being displayed on display 108. For each image capture, biometric recognition module 102A generates biometric information 104 including biometric attributes associated with pedestrians 103A and 103B and communicates the biometric information 104 to computer 110. Biometric based demography module 171 of biometric based demography tool 105 determines the location and duration of visual attention of each pedestrian during the time sequence based on the biometric attributes associated with the biometric recognition instances of the time sequence. Based on the location and duration of visual attention of the pedestrian, biometric based demography module 171 determines a demographic attribute of the pedestrian.

For example, as illustrated in FIG. 5, each biometric recognition instance includes a measurement of head orientation. In the illustrated example, head orientation is expressed as a pair of angles to express the degree of vertical and horizontal tilt of the head relative to the display. For example, the angle pair "(0,0)" indicates that the head is exactly facing the display. The angle pair "(35,0)" indicates the person's head is tilted horizontally from the display by thirty five degrees, but is vertically in line with the display. This characterization of relative orientation of the head is exemplary. Many other coordinate schemes may be contemplated.

Based on the head orientation of pedestrians 103A and 103B during the time sequence of successive image captures, biometric based demography tool 105 determines the location and duration of visual attention of each pedestrian during the time sequence. For example, if the head orientation for each biometric recognition instance of pedestrian 103A during the time sequence is "(0,0)," biometric based demography tool 105 determines that pedestrian 103A was watching the display 108 for the entire time sequence. Similarly, if the head orientation of pedestrian 103B was initially "(0,0)" and then changed to "(35,0)" during the time sequence, biometric based demography tool 105 determines that pedestrian 103A was initially watching the display 108, but then turned away from the display.

Based on the media content displayed and the location and duration of visual attention of each pedestrian during the time sequence, biometric based demography module 171 determines a demographic attribute of the pedestrian. For example, if the media content includes a trailer for an upcoming horror movie, biometric based demography module 171 determines the demographic attribute that pedestrian 103B is not interested in horror movies based on pedestrian 103B turning away from the display.

Figure 11:
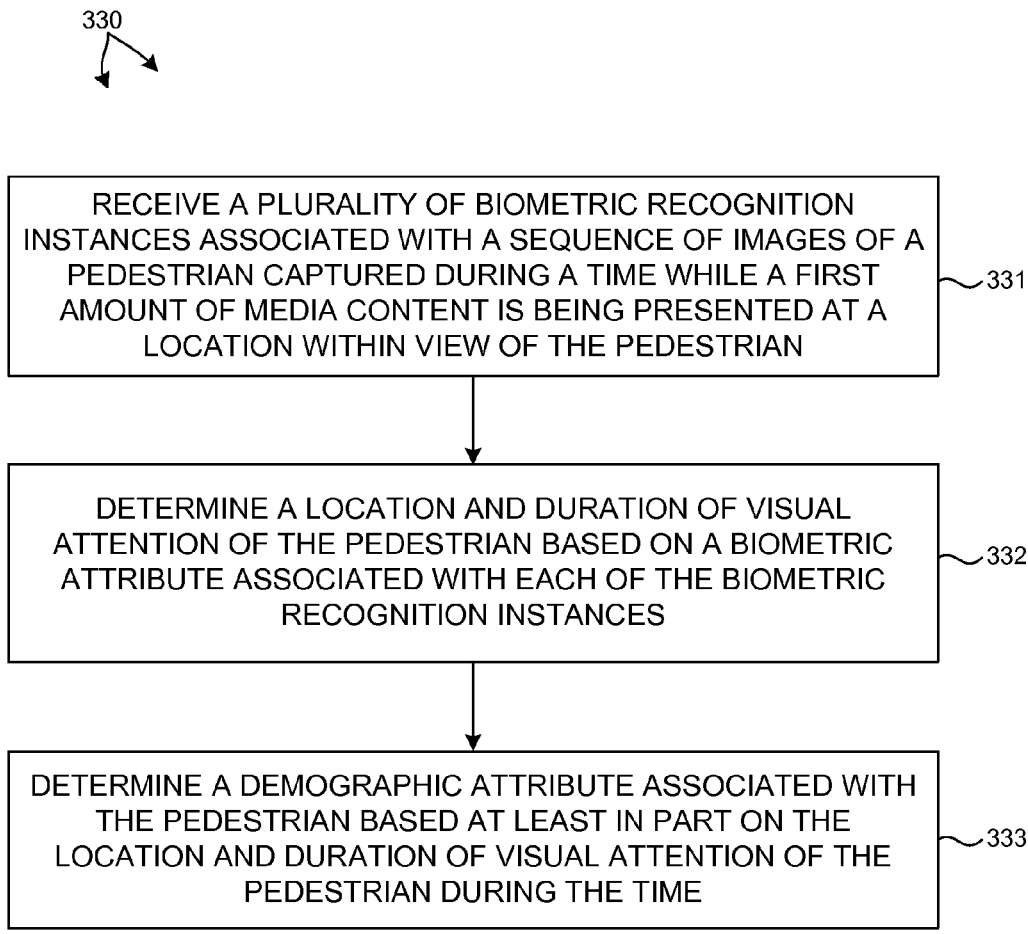
FIG. 11 is a flowchart illustrative of yet another method of biometric based demographic profiling 330.

FIG. 6 is illustrative of biometric based demography tool 105 operable in accordance with the method of biometric based demographic profiling 330 illustrated in FIG. 11. This illustration and corresponding explanation are provided by way of example as many other embodiments and operational examples may be contemplated. In the depicted embodiment, biometric based demography tool 105 includes biometric based demography module 171. In one example of block 331 of method 330, biometric based demography tool 105 receives a plurality of biometric recognition instances associated with a sequence of images of a pedestrian captured during a time while a first amount of media content is being presented at a location within view of the pedestrian. In one example of block 332 of method 330, biometric based demography tool 105 determines a location and duration of visual attention of the pedestrian based on a biometric attribute associated with each of the biometric recognition instances. In one example of block 333 of method 330, biometric based demography tool 105 determines a demographic attribute associated with the pedestrian based at least in part on the location and duration of visual attention of the pedestrian during the time. The resulting biometric based demographic 143 is communicated from biometric based demography module 171 for further use by a user of biometric based demography tool 105.

As discussed herein, each biometric recognition unit 102 captures image data of passing pedestrians, derives biometric attributes associated with individual pedestrians from the image data, and communicates biometric information 104 to computer 110. In one aspect, biometric information 104 may be analyzed to determine the number of people in the retail facility at any given time and as a function of time, the rate of ingress and egress of people at a given location (e.g. retail facility entrances) at any given time and as a function of time, the number of repeat visitors present within the retail facility at any given time and as a function of time, etc. In some embodiments, the identity of repeat visitors may be determined from an analysis of biometric information 104.

As discussed above, methods 310, 320, and 330 may be executed by biometric based demography tool 105 running within computer 110. An operator may interact with biometric based demography tool 105 via a locally delivered user interface (e.g., GUI displayed by terminal equipment directly connected to computer 110). In other embodiments, an operator may interact with biometric based demography tool 105 via a web interface communicated over the internet.

Figure 12:
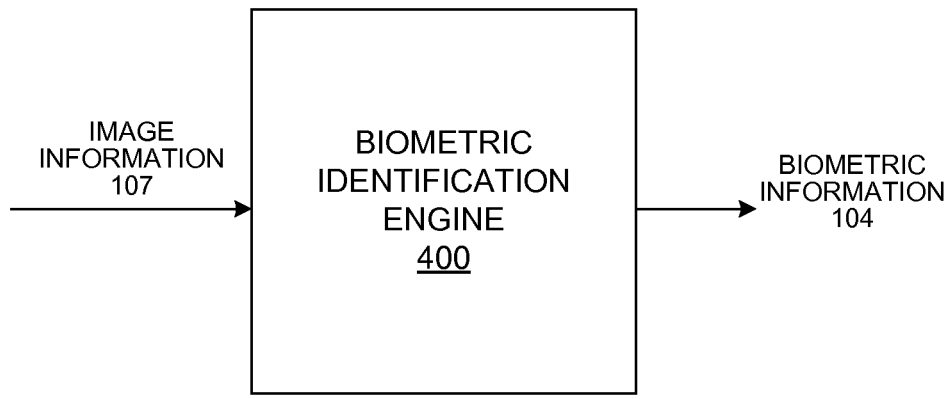
FIG. 12 is a diagram illustrative of a biometric identification engine 400 configured to implement biometric identification functionality as discussed herein.

Although, methods 310, 320, and 330 may be executed by biometric based demography tool 105 running within computer 110, it may also be executed entirely or in part by dedicated hardware. FIG. 12 illustrates a biometric identification engine 400 configured to implement biometric identification functionality as discussed herein. In one example, biometric identification engine 400 receives image information 107 as input. Biometric identification engine 400 implements biometric identification functionality as discussed herein and generates biometric information 104.

Figure 13:
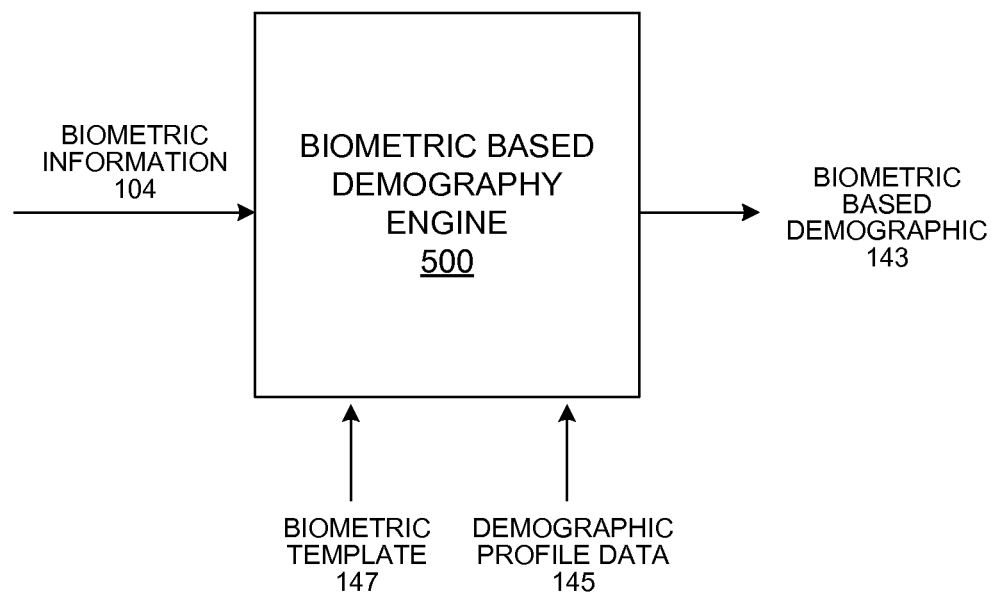
FIG. 13 is a diagram illustrative of a biometric based demography engine 500 configured to implement biometric based demography functionality as discussed herein.

Although, methods 310, 320, and 330 may be executed by biometric based demography tool 105 running within computer 110, it may also be executed entirely or in part by dedicated hardware. FIG. 13 illustrates a biometric based demography engine 500 configured to implement biometric based demography functionality as discussed herein. In one example, biometric based demography engine 500 receives biometric information 104, biometric template data 147, and demographic profile data 145 as input. Biometric based demography engine 500 implements biometric based demography functionality as discussed herein and generates biometric based demographics 143.

Figure 14:
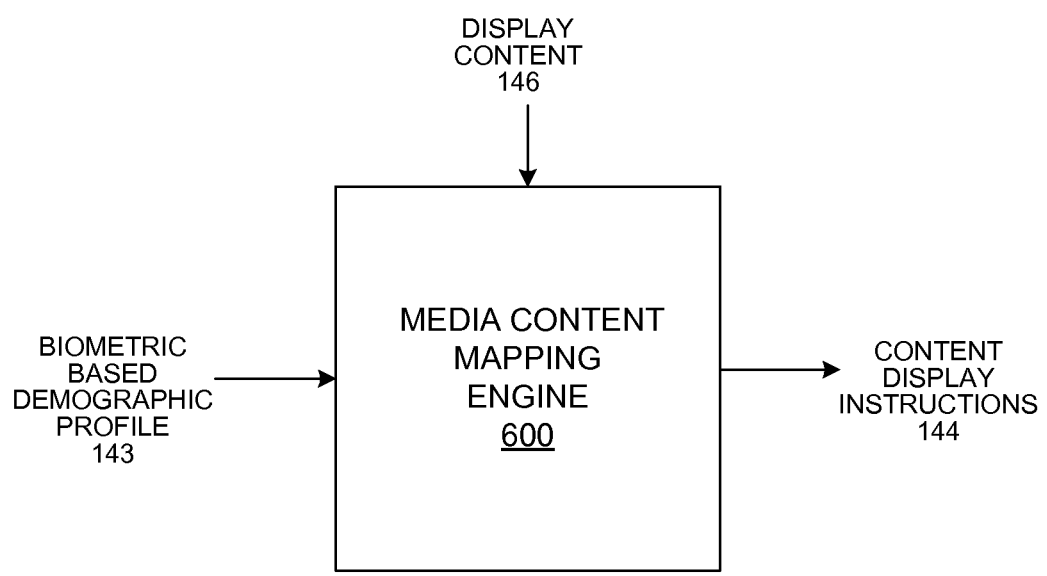
FIG. 14 is a diagram illustrative of a media content mapping engine 600 configured to implement biometric based media selection functionality as discussed herein.

Although, methods 310, 320, and 330, may be executed by biometric based demography tool 105 running within computer 110, it may also be executed in part by dedicated hardware (e.g., application specific integrated circuit, field programmable gate array, etc.). FIG. 14 illustrates a media content mapping engine 600 configured to implement biometric based media selection functionality as discussed herein. In one example, media content mapping engine 600 receives biometric based demographics 143 and display content 146 as input. Media content mapping engine 600 implements biometric based media selection functionality as discussed herein and generates content display instructions 144 useable to command a display unit 108 to display particular media content.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. For example, selected interactive media may be presented by a display unit 108, however, in other examples, selected interactive media may be presented by targeted e-mails or conventional mailings based on the identified demographic profile. In another example, in addition to demographic data, general pedestrian traffic statistics can be accumulated by biometric based demography system 100. For example, a cumulative count of passing pedestrians can be generated. In another example, a cumulative count of each identified demographic group of pedestrians can be generated. For example, the number of women, men, elderly, and children may be tracked over time. This information may be useful for planning purposes for future development of the retail facility. Accordingly, various modifications, adaptations, and combinations of various features of the described embodiments can be practiced without departing from the scope of the invention as set forth in the claims.

What is claimed is:

1. A method comprising:
   receiving a first biometric recognition instance including biometric information associated with a first pedestrian at a first location in a retail environment;
   receiving a second biometric recognition instance including biometric information associated with the first pedestrian at a second location in the retail environment; and
   determining a demographic attribute of the first pedestrian based on the first and second biometric recognition instances of the first pedestrian and the first and second locations, wherein the determining of the demographic attribute is based on a comparison of the biometric information of the first biometric recognition instance with a biometric template and a comparison of the biometric information of the second biometric recognition instance with the biometric template, wherein the biometric information of the first and second biometric recognition instances includes a location of image capture, a time of image capture, and a dimension of each facial feature including an eye spacing, a nose width, and an ear spacing, and wherein the biometric template includes a dimensional range associated with each of the facial features.

2. The method of claim 1, further comprising:
   selecting an amount of media content for presentation to the first pedestrian based at least in part on the determined demographic attribute; and
   presenting the amount of media content to the first pedestrian.

3. The method of claim 2, wherein the amount of media content is interactive media content, and further comprising:
   receiving a response to the interactive media content indicating a recognition of the interactive media content and an identity of the first pedestrian.

4. The method of claim 1, wherein the first location is the entrance of a first retail store and the second location is the entrance of a second retail store.

5. The method of claim 1, further comprising:
   receiving a third biometric recognition instance including biometric information associated with a second pedestrian at the first location in the retail environment;
   receiving a fourth biometric recognition instance including biometric information associated with the second pedestrian at the second location in the retail environment; and
   determining a demographic attribute of the second pedestrian based on any of the third and fourth biometric recognition instances of the second pedestrian and the first and second locations.

6. The method of claim 5, further comprising:
   determining a demographic profile based on the demographic attributes of the first pedestrian and the second pedestrian and the first and second locations.

7. The method of claim 1, wherein the determining of the demographic attribute associated with the first pedestrian involves associating publically available demographic information with the biometric information associated with the first pedestrian.

8. A biometric based demography system, comprising:
   a first biometric recognition unit including an image capture device, the first biometric recognition unit configured to generate a first biometric recognition instance including biometric information associated with a first pedestrian at a first location in a retail environment;
   a second biometric recognition unit including an image capture device, the second biometric recognition unit configured to generate a second biometric recognition instance including biometric information associated with the first pedestrian at a second location in the retail environment; and
   a computing system configured to:
      determine a demographic attribute of the first pedestrian based on the first and second biometric recognition instances of the first pedestrian and the first and second locations, wherein the determining of the demographic attribute is based on a comparison of the biometric information of the first biometric recognition instance with a biometric template and a comparison of the biometric information of the second biometric recognition instance with the biometric template, wherein the biometric information of the first and second biometric recognition instances includes a location of image capture, a time of image capture, and a dimension of each facial feature including an eye spacing, a nose width, and an ear spacing, and wherein the biometric template includes a dimensional range associated with each of the facial features.

9. The biometric based demography system of claim 8, wherein the computing system is further configured to:
   select an amount of media content for presentation to the first pedestrian based at least in part on the determined demographic attribute; and
   present the amount of media content to the first pedestrian.

10. The biometric based demography system of claim 9, wherein the amount of media content is interactive media content, and wherein the computing system is further configured to:
    receive a response to the interactive media content indicating a recognition of the interactive media content and an identity of the pedestrian.

11. The biometric based demography system of claim 8, wherein the first location is the entrance of a first retail store and the second location is the entrance of a second retail store.

12. The biometric based demography system of claim 8, wherein the first biometric recognition unit is further configured to generate a third biometric recognition instance including biometric information associated with a second pedestrian at the first location in the retail environment;
  wherein the second biometric recognition unit is further configured to generate a fourth biometric recognition instance including biometric information associated with the second pedestrian at the second location in the retail environment; and
  wherein the computing system is further configured to determine a demographic attribute of the second pedestrian based on any of the third and fourth biometric recognition instances of the second pedestrian and the first and second locations.

13. The biometric based demography system of claim 12, wherein the computing system is further configured to:
  determine a demographic profile based on the demographic attributes of the first pedestrian and the second pedestrian and the first and second locations.

14. The biometric based demography system of claim 8, wherein the determining of the demographic attribute associated with the first pedestrian involves associating publically available demographic information with the biometric information associated with the first pedestrian.

15. A non-transitory, computer-readable medium, comprising:
  code for causing a computing system to receive a first biometric recognition instance including biometric information associated with a first pedestrian at a first location in a retail environment;
  code for causing the computing system to receive a second biometric recognition instance including biometric information associated with the first pedestrian at a second location in the retail environment; and
  code for causing the computing system to determine a demographic attribute of the first pedestrian based on the first and second biometric recognition instances of the first pedestrian and the first and second locations, wherein the determining of the demographic attribute is based on a comparison of the biometric information of the first biometric recognition instance with a biometric template and a comparison of the biometric information of the second biometric recognition instance with the biometric template, wherein the biometric information of the first and second biometric recognition instances includes a location of image capture, a time of image capture, and a dimension of each facial feature including an eye spacing, a nose width, and an ear spacing, and wherein the biometric template includes a dimensional range associated with each of the facial features.

16. The non-transitory, computer-readable medium of claim 15, further comprising:
  code for causing the computing system to select an amount of media content for presentation to the first pedestrian based at least in part on the determined demographic attribute; and
  code for causing the computing system to present the amount of media content to the first pedestrian.

17. The non-transitory, computer-readable medium of claim 16, wherein the amount of media content is interactive media content, and further comprising:
  code for causing the computer to receive a response to the interactive media content indicating a recognition of the interactive media content and an identity of the first pedestrian.

18. The non-transitory, computer-readable medium of claim 15, wherein the first location is the entrance of a first retail store and the second location is the entrance of a second retail store.

19. The non-transitory, computer-readable medium of claim 15, further comprising:
  code for causing the computer to receive a third biometric recognition instance including biometric information associated with a second pedestrian at the first location in the retail environment;
  code for causing the computer to receive a fourth biometric recognition instance including biometric information associated with the second pedestrian at the second location in the retail environment; and
  code for causing the computer to determine a demographic attribute of the second pedestrian based on any of the third and fourth biometric recognition instances of the second pedestrian and the first and second locations.

20. The non-transitory, computer-readable medium of claim 19, further comprising:
  code for causing the computer to determine a demographic profile based on the demographic attributes of the first pedestrian and the second pedestrian and the first and second locations.

* * * * *